July 18, 1944. T. R. JAMES 2,354,124
LOCKING CHAIN LINKS
Filed Nov. 16, 1942 3 Sheets-Sheet 1
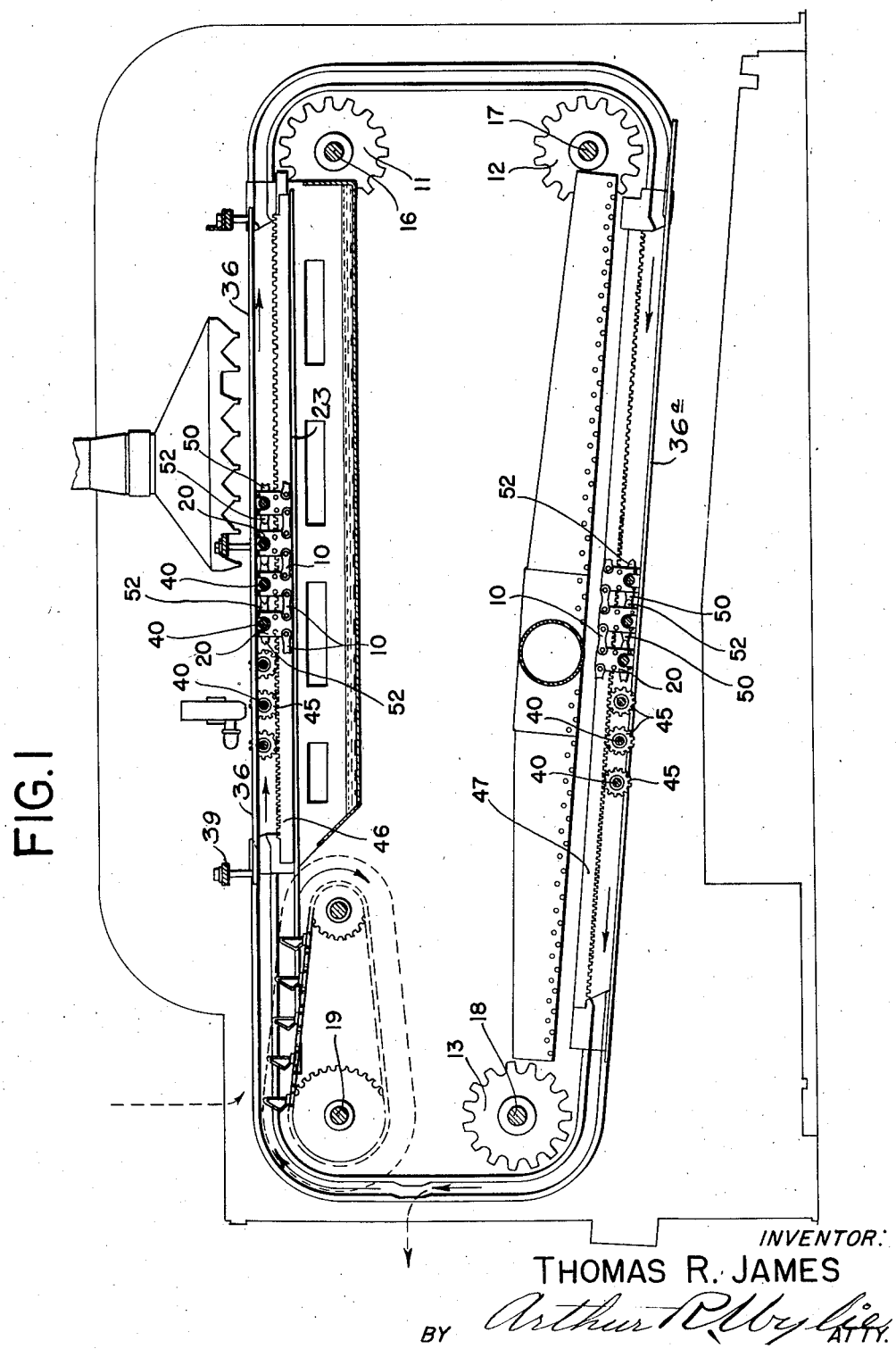
INVENTOR:
THOMAS R. JAMES
BY Arthur R. Wylie
ATTY.

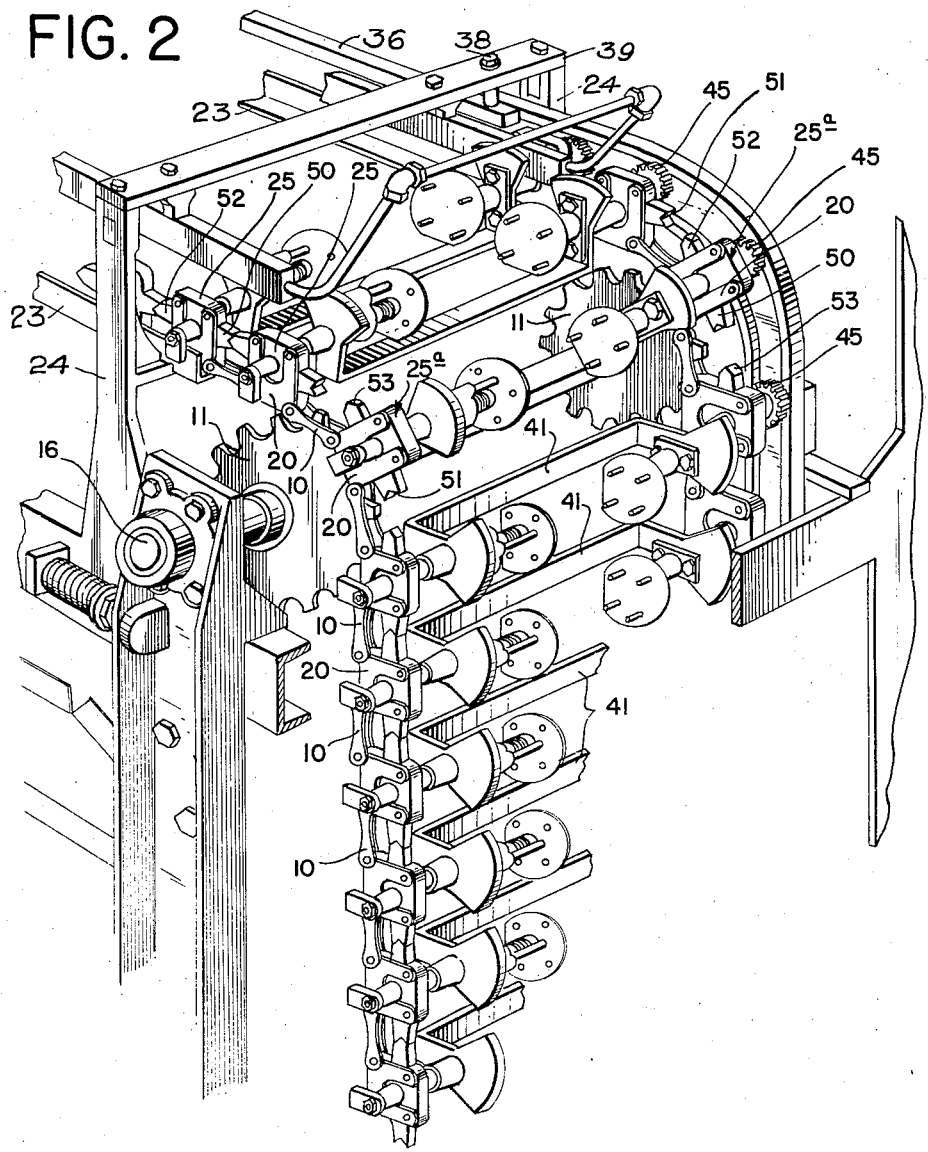

July 18, 1944.  T. R. JAMES  2,354,124
LOCKING CHAIN LINKS
Filed Nov. 16, 1942  3 Sheets-Sheet 3
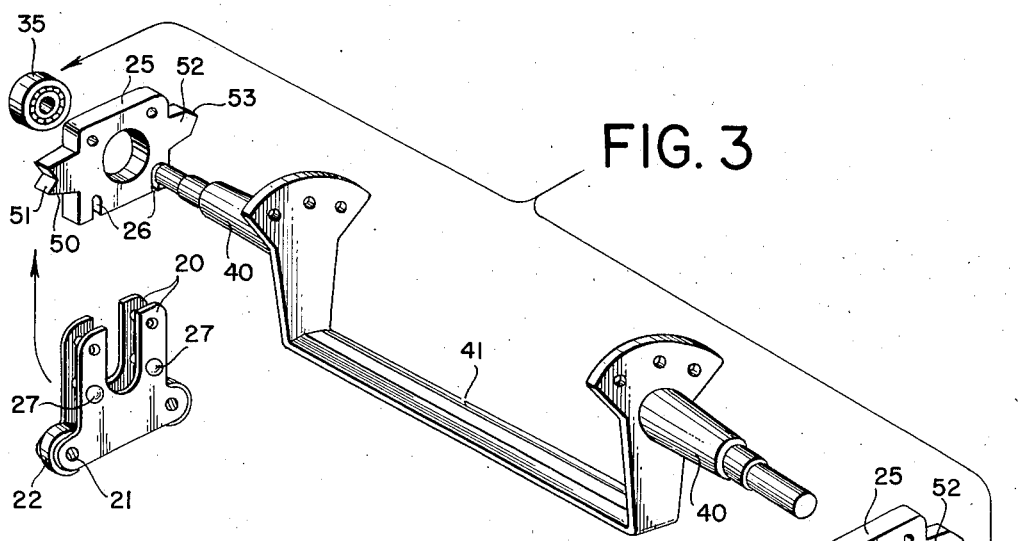
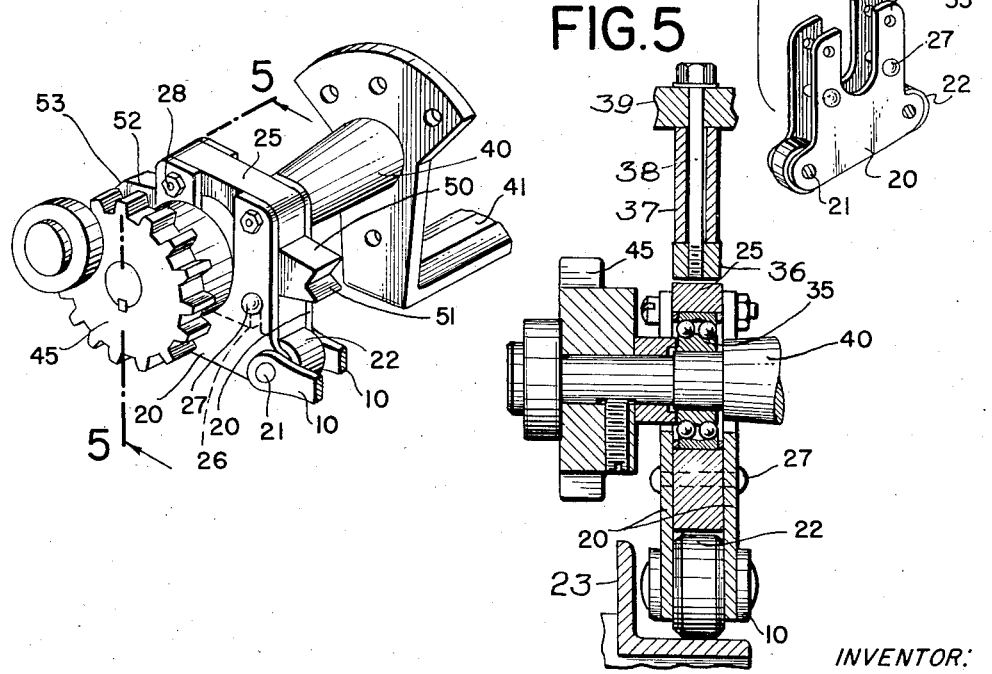
INVENTOR:
THOMAS R. JAMES
BY *Arthur R. Wrigley*
ATTY.

Patented July 18, 1944

2,354,124

UNITED STATES PATENT OFFICE 2,354,124

LOCKING CHAIN LINKS

Thomas R. James, Minneapolis, Minn., assignor to General Mills, Inc., a corporation of Delaware Application November 16, 1942, Serial No. 465,730

6 Claims. (Cl. 198—131)

This invention relates to chains, particularly spaced chains, whose links have shafts rotatably mounted therein so that it is necessary that the links shall not turn with respect to each other.

An object of the invention is to provide simple and efficient means for preventing relative rotative movement between adjacent links when the chain is traveling in a straight line.

This and other objects, as will hereinafter appear, are accomplished by this invention which is fully described in the following specification and shown in the accompanying drawings in which Figure 1 is a side elevation partly in section of a machine embodying the invention and showing the housing only in outline;

Fig. 2 is a partial enlarged perspective of a portion of the chain passing around a pair of sprockets;

Fig. 3 is a perspective showing parts of one shaft unit disassembled;

Fig. 4 is an enlarged perspective of one end of the same assembled; and

Fig. 5 is a partial longitudinal section on the line 5—5 of Fig. 4.

The invention is illustrated in connection with an endless chain 10 running around sprockets 11, 12, 13 on shafts 16, 17, 18, respectively, and around a sprocket not shown on the shaft 19.

The improvement in this instance lies in the chain and associated parts which is well shown in Fig. 2. The chain consists of links 10 and 20 (Fig. 4) which are pivotally connected by means of pins 21. The links 10 and 20 are arranged in pairs which are separated by means of a roller 22 on each one of the pins 21. Chain links 10 and 20 slide on angle iron supports 23 above and on 23ᵃ on the return below which are carried on suitable supports 24 (Fig. 2).

Between two laterally spaced links 20 is placed a block 25 which is provided with two parallel slots 26 on its lower surface adapted to pass over two similarly spaced rivets 27. Two bolts 28 then pass through spaced holes 29 in the tops of the links 20 and through holes 30 in the top of the block 25. This permits of a ready removal and insertion of the block for inspection or repair. Each block carries a ballbearing 35 which is retained in place by the tops of the links 20.

The ballbearings 35 are arranged in aligned pairs in the two spaced chains, one at each side of the machine, and are adapted to receive a shaft 40 having an offset central portion 41 as shown in Fig. 3 for the purpose of carrying the carton or cartridge to be waxed, as more fully described in my earlier patent application.

On one end of this shaft is keyed a gear 45 which, as the shaft advances, is adapted to mesh with stationary racks 46, 47 on the machine, as shown in Fig. 1, to cause the shafts 40 to rotate as they advance.

A guard rail 36 overlies the blocks 25 but without normally touching them and extends throughout the length of the rack 46. The guard rail is carried by spacers 37 and screws 38 from cross members 39. A similar guard rail 36ᵃ (Fig. 1) suitably supported lies below the blocks on the bottom of the machine. These guard rails prevent the gears getting out of mesh with the rack, particularly on the upper rack when cartons get caught.

The rotation of the shafts 40 tends to cause the links 20 to rotate and wobble somewhat as the chain advances. In order to overcome this I have provided means for preventing relative movement between adjacent links. Thus on the links 25, as shown in Fig. 3, I have provided extensions 50 with notches 51 extending in one direction and projections 52 terminating in chisel-like points 53 in the other direction. Referring now to Fig. 2, it will be noted that as the blocks pass around the sprocket assuming the position 25ᵃ, they are separated from adjacent blocks but that as the chain leaves the sprocket and again moves in a straight line the points 53 fit into the notches 51 with the result that the rotation of the shafts 40 no longer tends to rock one of the blocks with respect to adjacent portions of the chain.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. In a machine, a conveyor chain having a series of hinged links, blocks carried by alternate links of the chain and having interengaging fingers extending forward and backward from each link and engaging complementary fingers of adjacent blocks for operably connecting the blocks in each chain, each block being held by the adjacent links at each side to prevent them from rotating relative to each other when the chain links are in a straight line but permitting the blocks to separate when the chain passes around a sprocket.

2. In a machine, spaced parallel conveyor chains each having a series of hinged links, blocks carried by alternate links of both chains and having notched fingers extending from each block in one direction longitudinally of the chain and complementary pointed fingers extending from each block in the opposite direction, said fingers lying above the center lines of the chains for operably connecting complementary fingers in adjacent blocks in each chain to prevent the blocks from rotating relative to each other when the chain links are in a straight line but permitting the blocks to separate when passing around a sprocket, and shafts journaled in corresponding blocks in the two chains.

3. In a machine, spaced parallel conveyor chains each having a series of hinged links, blocks carried by alternate links of both chains and having notched fingers extending from each block in one direction longitudinally of the chain and complementary pointed fingers extending from each block in the opposite direction, said fingers lying above the center lines of the chains for operably connecting complementary fingers in adjacent blocks in each chain to prevent the blocks from rotating relative to each other when the chain links are in a straight line but permitting the blocks to separate when passing around a sprocket, and members extending from a block in one chain to a corresponding block in the other chain.

4. In a machine, spaced parallel conveyor chains each having a series of hinged links, bearing blocks secured at each side to the chains, shafts journaled for rotation in these blocks, the blocks having notched fingers extending from the blocks in one direction and complementary pointed fingers extending in the other direction and engaging with the notched fingers of the next adjacent blocks when the chain links are in a straight line preventing relative rotation of the blocks and which lie above the center line of the chain so that said fingers separate as the chain passes around a sprocket, a gear wheel on each shaft, and a rack for rotating the gears as the chains advance.

5. The combination according to claim 4 in which each chain has spaced links between which the blocks are adapted to lie, and means for securing the blocks between said spaced links.

6. The combination according to claim 4 in which each chain has spaced links between which the blocks are adapted to slide, spaced rivets connecting adjacent plates of one chain, the blocks having parallel slots to pass over said spaced rivets, and bolts passing through said links and blocks to secure them together.

THOMAS R. JAMES.